(12) United States Patent
Scheper et al.

(10) Patent No.: US 9,261,146 B2
(45) Date of Patent: Feb. 16, 2016

(54) RESILIENT JOINT MEMBER WITH SPACE-SAVING COLLAR BUSHING ARRANGEMENT

(71) Applicant: SGF SUEDDEUTSCHE GELENKSCHEIBENFABRIK GMBH & CO. KG, Waldkraiburg (DE)

(72) Inventors: Bernd Scheper, Reichertsheim (DE); Marian Kynast, Burghausen (DE); Karl-Heinz Martini, Kraiburg (DE); Thomas Lechner, Waldkraiburg (DE); Joachim Reihle, Schnaitsee (DE); Wolfgang Nindel, Muehldorf (DE); Werner Schreitmiller, Muehldorf (DE)

(73) Assignee: SGF SUEDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 0 days.

(21) Appl. No.: 14/175,185

(22) Filed: Feb. 7, 2014

(65) Prior Publication Data
US 2014/0228134 A1    Aug. 14, 2014

(30) Foreign Application Priority Data
Feb. 8, 2013   (DE) .................... 20 2013 001 278 U

(51) Int. Cl.
*F16D 3/62*    (2006.01)
*F16D 3/78*    (2006.01)
(52) U.S. Cl.
CPC ... *F16D 3/78* (2013.01); *F16D 3/62* (2013.01)
(58) Field of Classification Search
CPC .................... F16D 3/62; F16D 3/78

USPC ............... 464/69, 93–95; 403/277, 285, 354
See application file for complete search history.

(56) References Cited

U.S. PATENT DOCUMENTS

| 3,837,179 | A  | * | 9/1974  | Barth |
|---|---|---|---|---|
| 4,790,794 | A  |   | 12/1988 | Takeda et al. |
| 4,846,761 | A  | * | 7/1989  | Weiss ............... 464/69 |
| 8,460,113 | B2 |   | 6/2013  | Waehling et al. |
| 8,771,089 | B2 | * | 7/2014  | Scheper et al. ........ 464/69 |

FOREIGN PATENT DOCUMENTS

JP           3-239817 A  * 10/1991 ............ 464/69
WO    WO 2012/041466 A1  *  4/2012

\* cited by examiner

*Primary Examiner* — Gregory Binda
(74) *Attorney, Agent, or Firm* — Carter, DeLuca, Farrell & Schmidt, LLP

(57) ABSTRACT

A resilient joint member for a shaft arrangement is provided including a plurality of bushings arranged at predetermined angular intervals in the peripheral direction in relation to a center axis of the joint member, a plurality of loop bundles which loop around respectively two adjacent bushings, each bushing has at least two loop bundles looped around it, an elastic sheath in which the loop bundles and the bushings are at least partly embedded. The bushings have an axial tubular section around which there loop the loop bundles associated with the bushing and on which, at least at an axial end region. A collar element is arranged for axial support of one of the loop bundles at the axial end region and includes a support section that runs substantially radially with respect to the tubular section, and a fixing section is in contact with the tubular section.

19 Claims, 10 Drawing Sheets

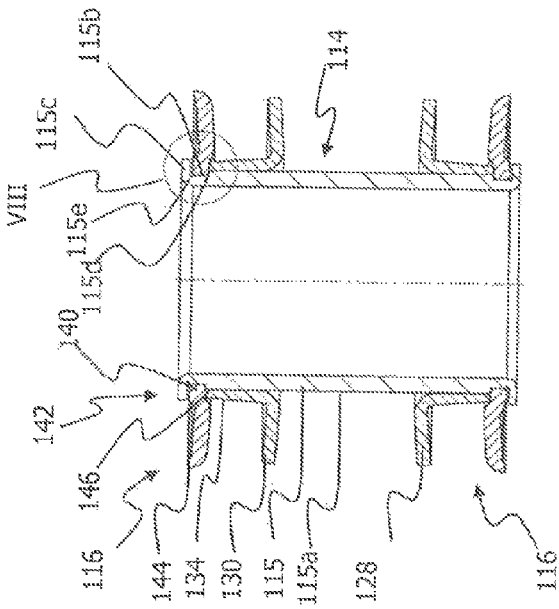
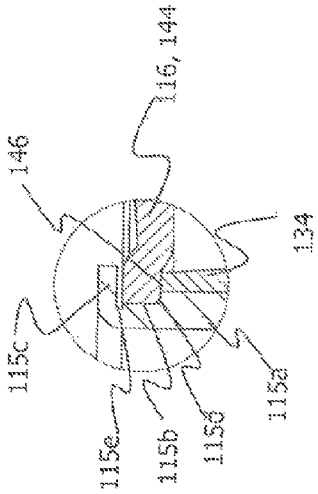
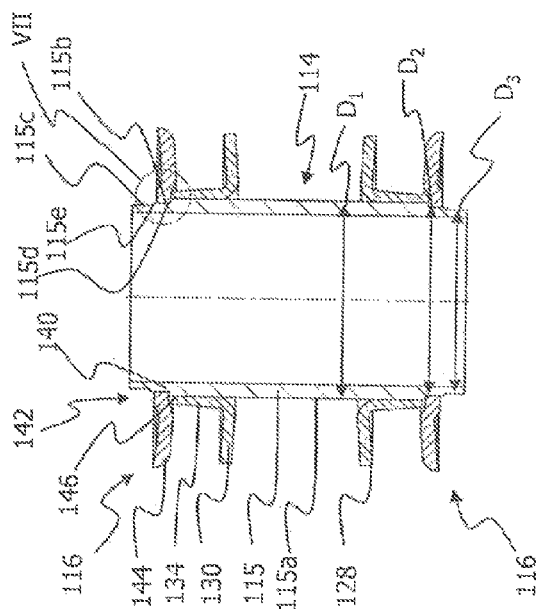
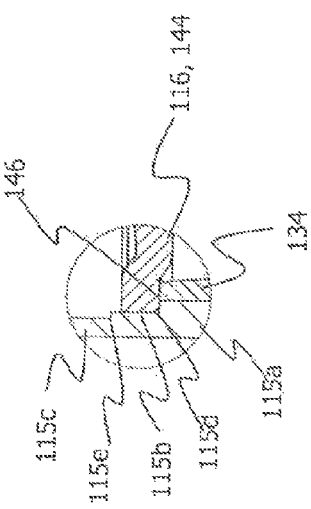

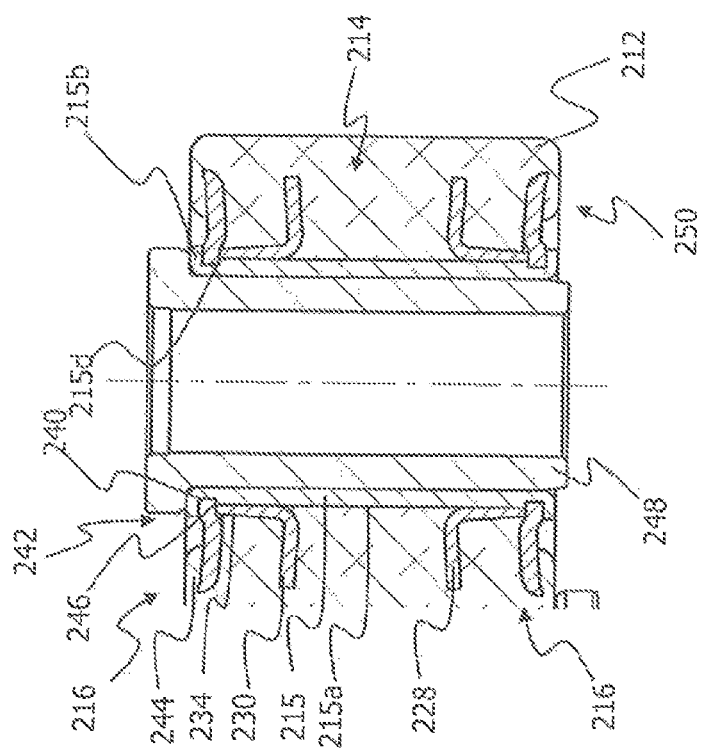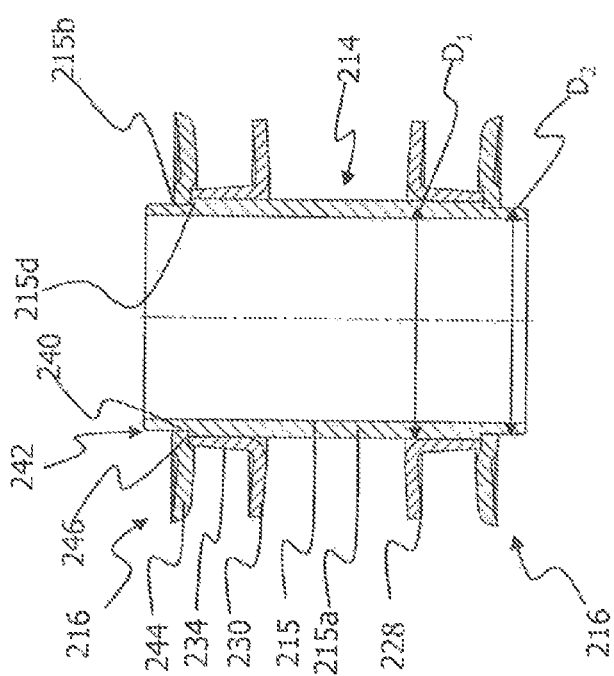

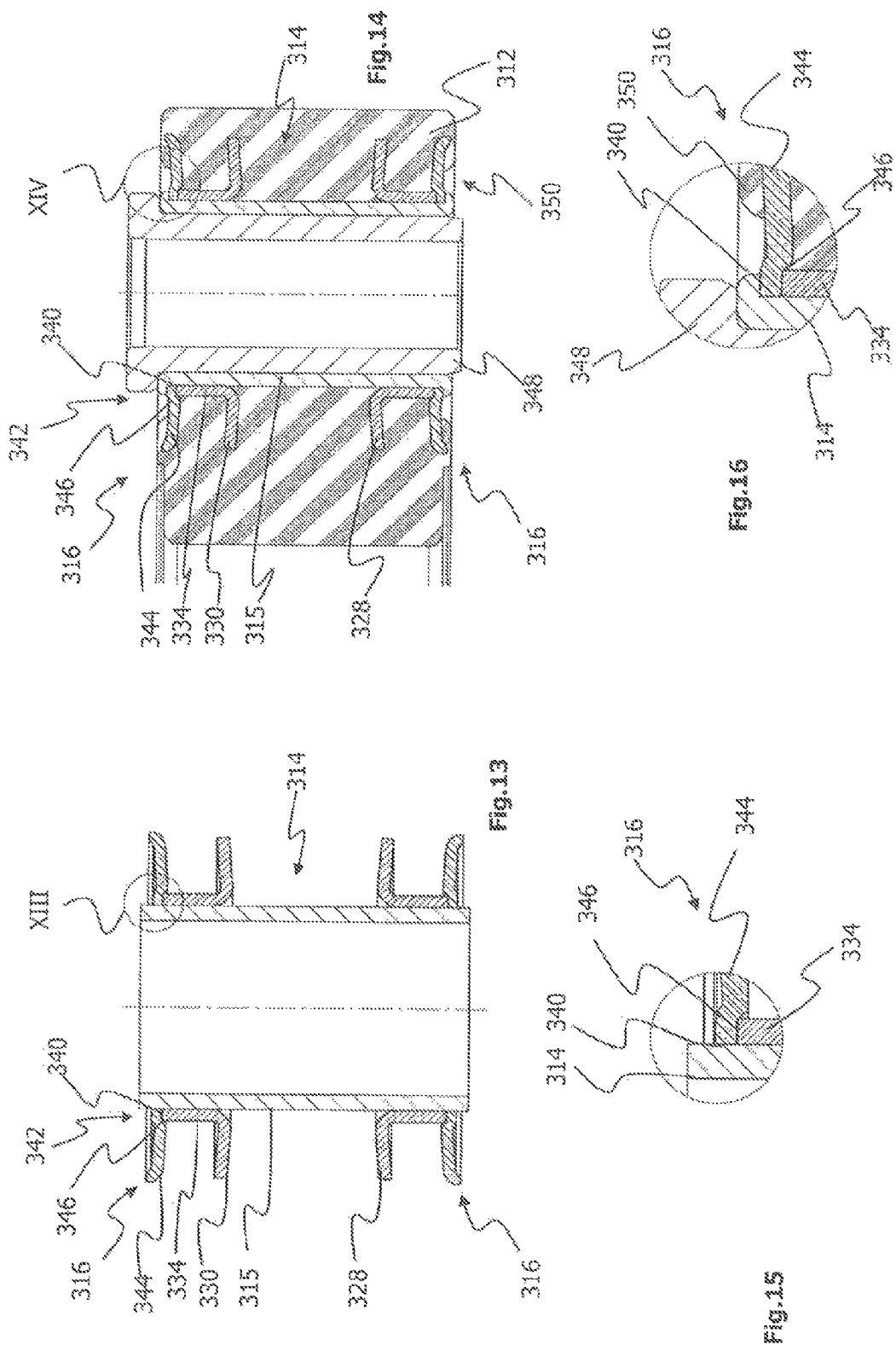

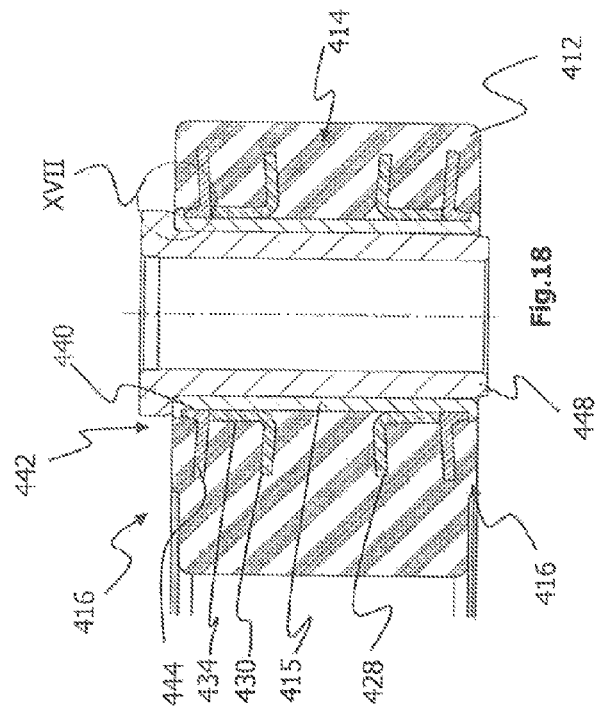
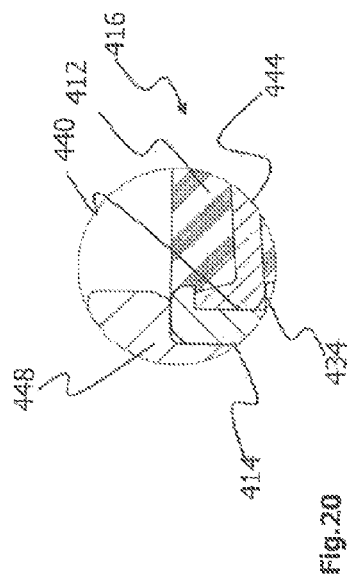
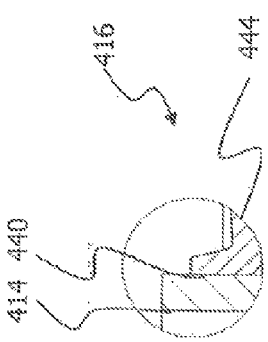

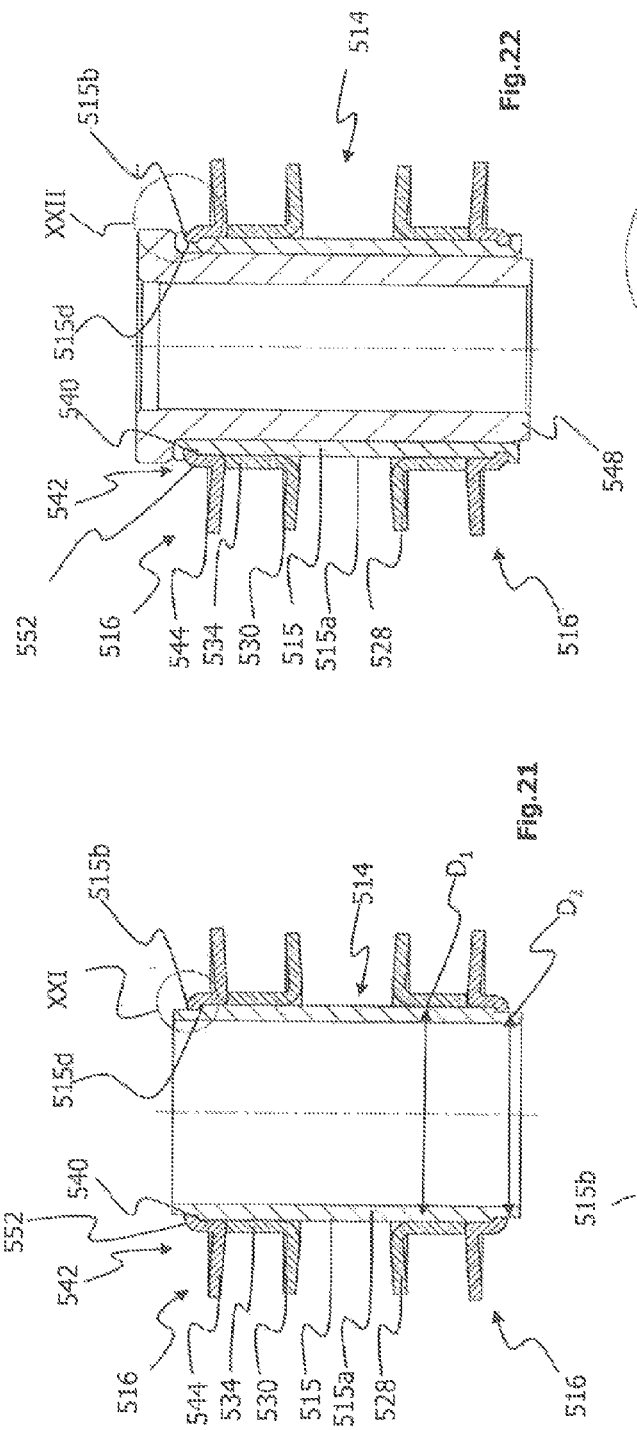

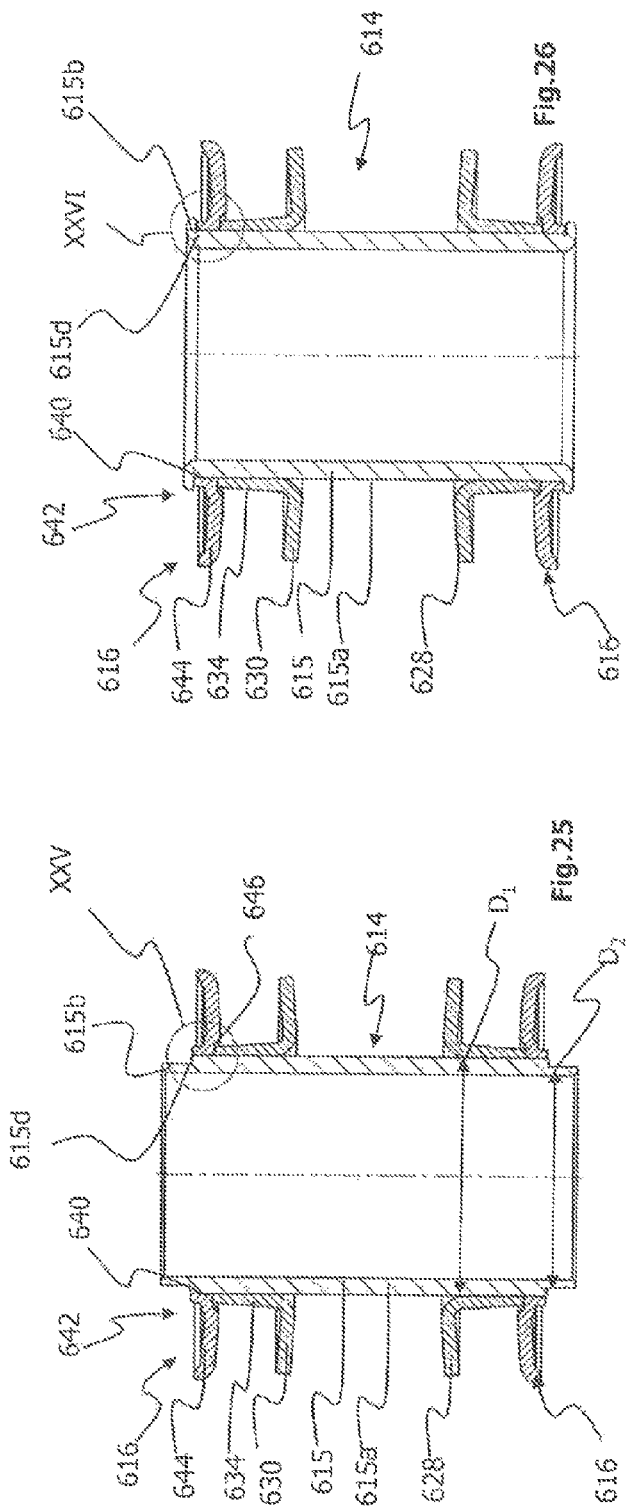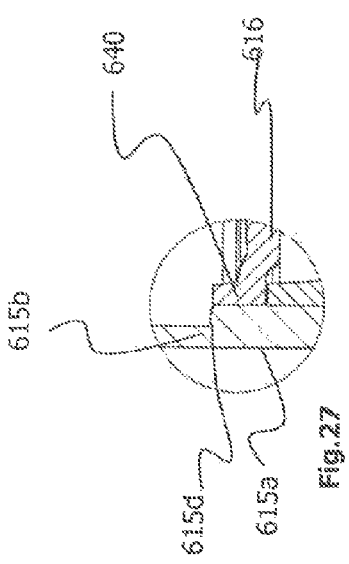

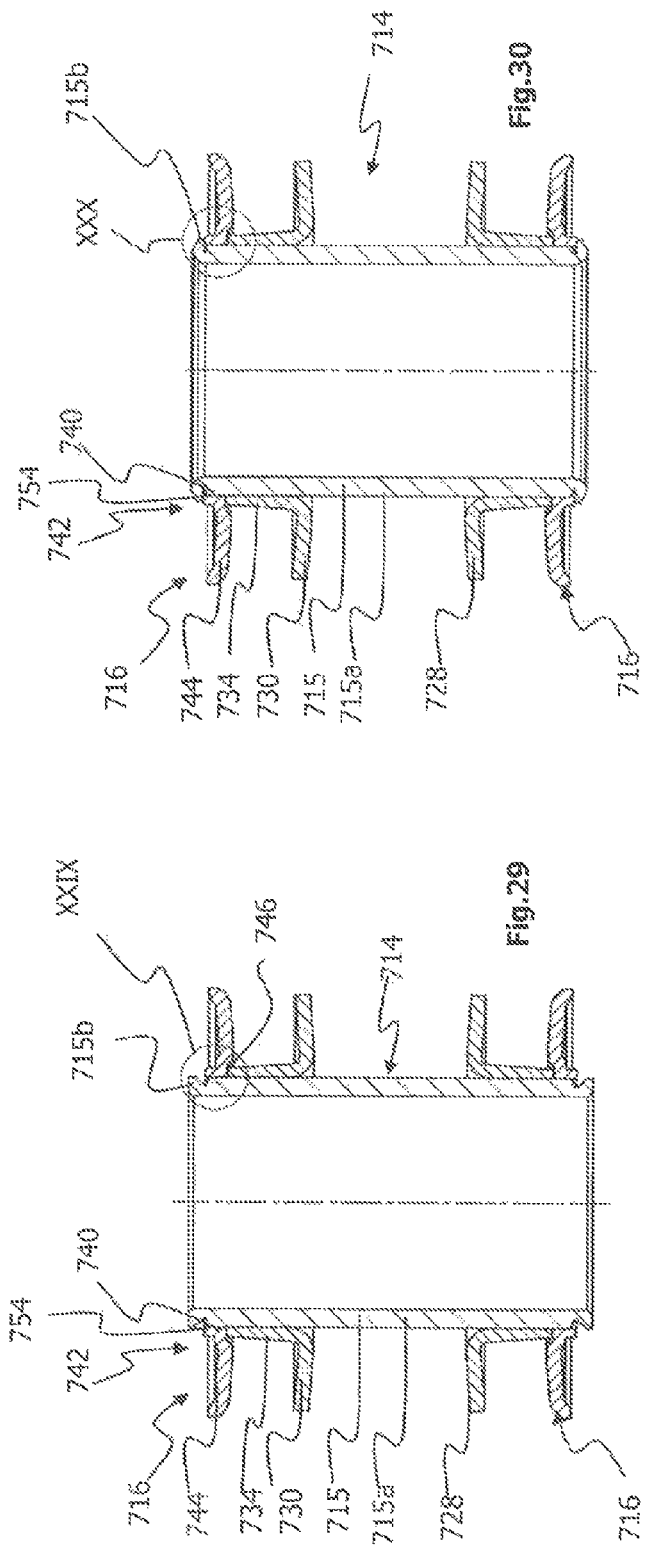

RESILIENT JOINT MEMBER WITH SPACE-SAVING COLLAR BUSHING ARRANGEMENT

The present invention relates to a resilient joint member for a shaft arrangement for the articulated connection of two shaft sections, including a plurality of bushings which are arranged at predetermined angular intervals in the peripheral direction in relation to a centre axis of the joint member, a plurality of loop bundles, wherein each loop bundle loops around respectively two adjacent bushings and each bushing has at least two loop bundles looped around it, an elastic sheath in which the loop bundles and the bushings are at least partly embedded, wherein the bushings have an axial tubular section around which there loop the loop bundles that are associated with the bushing and on which, at least at an axial end region, a collar element is arranged for axial support of one of the loop bundles, and wherein the collar element that is arranged at the axial end region is constructed to have a support section that runs substantially radially with respect to the tubular section and to have a fixing section that is in contact with the tubular section.

BACKGROUND

Resilient joint members of this kind are known from the prior art. For example in the document DE 10 2008 047 596 A1, a resilient joint member is described in which there are advantageously provided collar bushing arrangements which enable loop bundles to be wound separately and loop bundles to be pushed onto the bushing arrangements later, as part of assembly. In collar bushing arrangements of this kind, the collar elements are pressed onto the tubular section. For this purpose, relatively long axial sections in which the fixing section of the collar element overlaps with the tubular section of the bushing are necessary in order to ensure a stable press fit. If the press fit is not made sufficiently secure, then under load the collar element may become detached from the tubular section and pop off the latter, which results in immediate failure of the resilient joint member. If there is insufficient axial length available to ensure a stable press fit, the press fit solution that is disclosed in this document is not typically usable.

The document DE 37 34 089 A1 describes a resilient joint member which has a bushing arrangement with collar elements that are U-shaped in section. These are also pressed onto tubular sections. This solution is relatively complicated and so it is disadvantageous from a production engineering point of view, in particular in respect of mounting the loop bundles.

SUMMARY OF THE INVENTION

In the light of this situation, the object of the present invention is to provide a resilient joint member of the type indicated at the outset which counters the problems explained above and can also be constructed to have collar elements that are of relatively short construction in the axial direction.

This object is achieved by a resilient joint member of the type indicated at the outset in which it is provided for the fixing section of the collar element to be axially caulked to the tubular section.

Unlike the prior art, in the present invention it is provided for the connection and mutual fixing of the collar element and the tubular section to be achieved in that axial caulking areas are provided which, despite the short axial construction, ensure sufficient fixing of the collar element to the tubular section.

According to an embodiment of the invention, the fixing section of the collar element may be fixed to the tubular section by local axial caulking areas. This may be achieved in that, once the collar element has been positioned on the tubular section in its intended position, a stamping tool having local deformation edges is inserted into the tubular section from the inside and a sufficiently large stamping force is then applied. The local axial caulking is then produced in the region of the deformation edges, the material of the tubular section and also of the collar element being cold-formed by the deformation edges. During this, a sufficient quantity of material is displaced to ensure that the collar element can no longer be detached from the tubular section. In this way, reliable fixing of the collar element to the tubular section may be achieved even on a relatively short axial section, by local impressed stamping. As an alternative, the caulking may also be provided on the fixing section.

Preferably, a further development of the invention provides for the axial caulking areas to be arranged on the end face, at the axial end of the tubular section or the fixing section. This has the effect of making the best possible use of the deformation region that is available for the caulking. The term "end face" here relates to the end surfaces of the tubular section or the fixing section.

Preferably, it may be provided in the invention for the axial caulking areas to be slot-shaped. This allows the axial caulking areas to be locally delimited and their construction to be controlled. Moreover, this makes it possible, by way of a complementary stamping tool, to achieve sufficient deformation with sufficient material displacement, even with relatively small deformation forces, to ensure a reliable connection of the collar element and the tubular section.

A further development of the invention provides for the axial caulking areas to be arranged at regular angular intervals over the inner periphery of the tubular section. In this context, it may further be provided for at least three, preferably six, nine or twelve, caulking areas to be provided over the periphery of the tubular section. In individual cases, however, it is also possible to provide more or fewer caulking areas. As an alternative, the caulking areas may also be provided on the outer periphery of the fixing section.

A further development of the invention provides for the tubular section and the fixing section to be radially widened in the region of the caulking areas, preferably in the shape of a star or conically. This widening may also be achieved by cold forming by means of the stamping tool indicated above. In this case, with a slot-shaped construction of the caulking areas it is preferably provided for the transitions between the caulking areas and the widening to be constructed with transition radii, which ensures that there is additional deliberate material displacement during the cold forming and improves the connection between the tubular section and the collar element.

According to the invention, it may further be provided for the transition between the support section and the fixing section of the collar element to be constructed such that it is stepped, with a transition shoulder in the support section. This is particularly advantageous if there is arranged on the tubular section, axially spaced from the end-face collar element, a further inner collar element that is associated with this collar element. Here, according to the invention it may be provided for the inner collar element to be L-shaped, as seen in a section containing the axis, with the inner collar element having a radial limb of the L and, abutting against the tubular section, an axial limb of the L. In this context, a further development of the invention provides for the axial limb of the L to be in contact with the end-face collar element. Further, in this context it is possible in the case of a variant embodiment of the invention for the axial limb of the L to abut against the transition shoulder. This may advantageously be utilised if the axial length of the axial limb of the L determines the width of a guide region for a loop bundle.

According to an embodiment of the invention, the bushing may have at least one axial end section of reduced external diameter. Further, by means of its at least one recess the collar element may bear against at least one radial section on the at least one tubular section of the bushing. As a result of the reduced diameter of the at least one end section and the at least one radial section, inset regions are formed on the bushing, and these serve to secure the axially outer collar elements on the bushing in the axial direction.

According to a further development of the invention, the fixing section of the collar elements may bear against the at least one axial end section of reduced external diameter. The at least one axial end section of reduced external diameter may, according to an embodiment of the invention, be axially caulked to the collar element. During the caulking, the fixing section of the collar elements is firmly connected to the bushing or the end section thereof, and after caulking may for example be overlapped by the axial end section.

The radial ends of the collar elements may be at least partly or at least in certain regions surrounded by the elastic sheath.

BRIEF DESCRIPTION OF THE DRAWINGS

The invention will be explained below by way of example with reference to the attached figures, in which:

FIGS. 7 and 8 show sectional views of a bushing arrangement according to a second exemplary embodiment;

FIGS. 9 and 10 show detail views of the bushing arrangement according to the second exemplary embodiment;

FIGS. 11 and 12 show sectional views of a bushing arrangement according to a third exemplary embodiment;

FIGS. 13 and 14 show sectional views of a bushing arrangement according to a fourth exemplary embodiment;

FIGS. 15 and 16 show detail views of the bushing arrangement according to the fourth exemplary embodiment;

FIGS. 17 and 18 show sectional views of a bushing arrangement according to a fifth exemplary embodiment;

FIGS. 19 and 20 show detail views of the bushing arrangement according to the fifth exemplary embodiment of the invention;

FIGS. 21 and 22 show sectional views of a bushing arrangement according to a sixth exemplary embodiment of the invention;

FIGS. 23 and 24 show detail views of the bushing arrangement according to the sixth exemplary embodiment;

FIGS. 25 and 26 show sectional views of a bushing arrangement according to a seventh exemplary embodiment;

FIGS. 27 and 28 show detail views of the bushing arrangement according to the seventh exemplary embodiment;

FIGS. 29 and 30 show sectional views of a bushing arrangement according to an eighth exemplary embodiment; and FIGS. 31 and 32 show detail views of the bushing arrangement according to the eighth exemplary embodiment.

DETAILED DESCRIPTION

Figure 1:
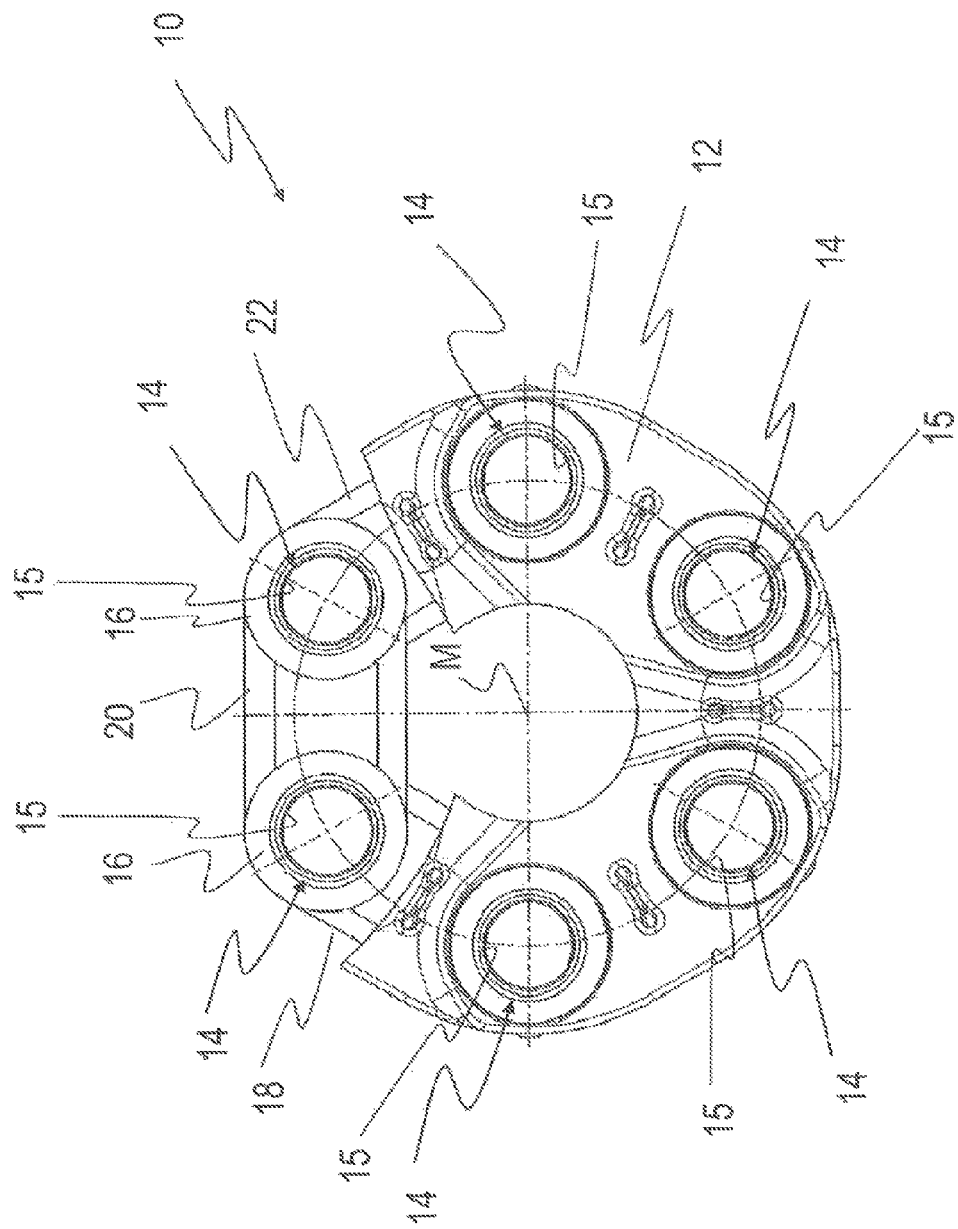
FIG. 1 shows a partly cut-away plan view as an illustration of the general construction of a resilient joint member according to the invention.

For the purpose of general explanation of the invention, FIG. 1 shows a partly cut-away plan view of a resilient joint member 10 having six bushings 14 that are surrounded by an elastic sheath 12. The bushings 14 are arranged at predetermined angular intervals around the joint member 10, in the peripheral direction in relation to a centre axis M. The bushings 14 are each provided with a tubular section 15 which runs axially, that is to say perpendicular to the plane of the drawing. In the region of the joint member 10 according to FIG. 1 that is illustrated cut away in the drawing, it can be seen that collar elements 16 are mounted on the axial ends of each tubular section 15 of the bushings 14. These collar elements 16 serve to axially support the loop bundles 18, 20 and 22.

It is also seen from FIG. 1 (and FIG. 3) that a plurality of loop bundles 18, 20 and 20, 22 respectively loop around each tubular section 15 of the bushings 14. Here, it may be provided that, in the condition in which the joint member 10 is installed in a shaft arrangement, in the event of load—that is to say, when a shaft section is driven and the torque is transmitted by way of the joint member 10 to a shaft section intended to be driven—the loop bundles 18, 22 are acted upon by a tensile force, while the loop bundle 20 and a further, parallel loop bundle that is embedded in the rubber sheath 12 and is not shown in FIG. 1 (loop bundle 26 in FIG. 3) and the rubber sheath 12 surrounding the latter are put under compressive load. If the direction of rotation were reversed, the relationships would be reversed.

Figure 2:
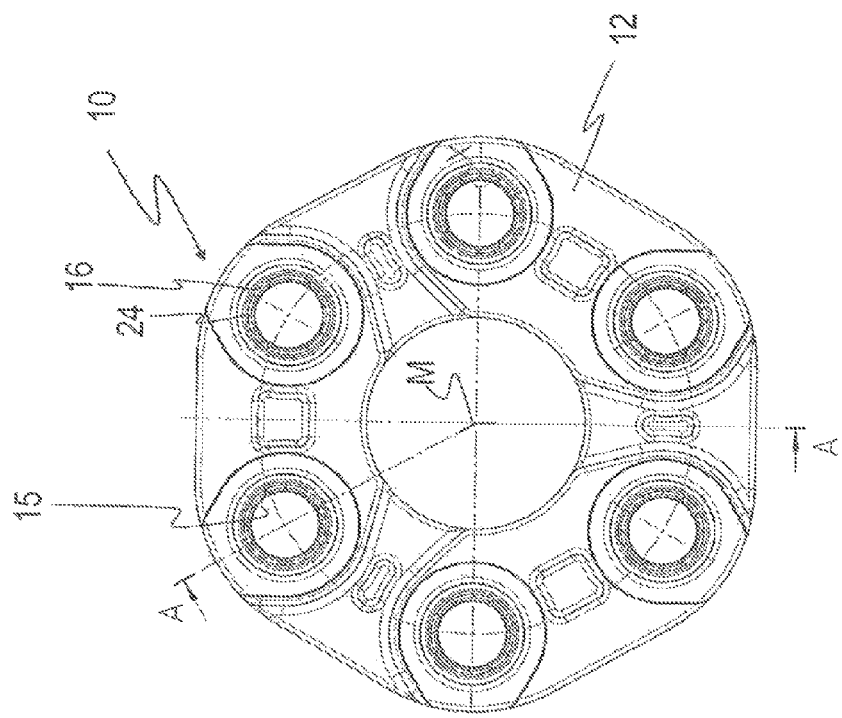
FIG. 2 shows a plan view of the complete resilient joint member according to the present invention.

FIG. 2 shows an embodiment of the present invention. The basic structure of the resilient joint member 10 of the present invention that is shown in FIG. 2 corresponds substantially to the basic structure described in relation to FIG. 1. As regards the invention, the main focus of attention is on the way the individual collar elements 16 are connected to the axial ends of the tubular sections 15. This connection is made by way of axial slot-shaped caulking areas 24 which can be seen in FIG. 2 and are provided at regular angular intervals on the end face of each tubular section 15. In the case of the example shown, twelve slot-shaped axial caulking areas 24 are provided in each case.

Figure 3:
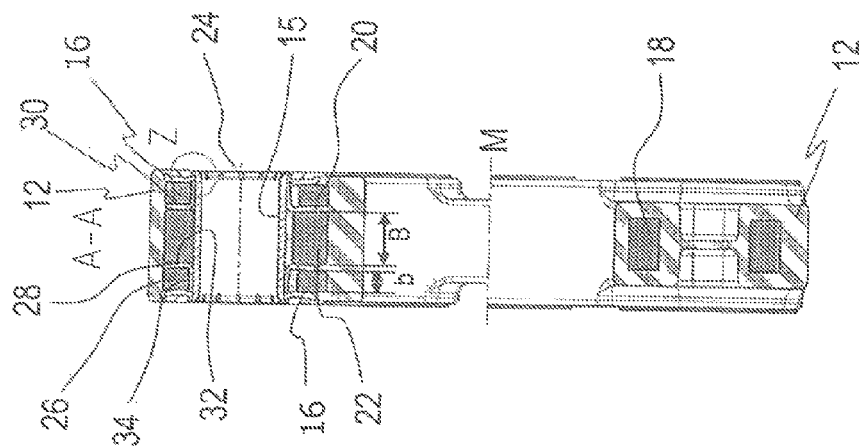
FIG. 3 shows a sectional view, containing the axis, through the resilient joint member according to the invention, along the line of section A-A in FIG. 2.

In the sectional view according to FIG. 3, which shows a section along the line of section A-A in FIG. 2, it can be seen in detail how the loop bundles 18, 20, 22 and the further loop bundle 26 are guided around the tubular section 15 and embedded in the rubber sheath 12. It can further be seen that collar elements 16 of small axial length are provided at each end face of the tubular section 15. This will be discussed in detail below in relation to FIGS. 4 to 6. It can furthermore be seen that there are provided, between the loop bundles 20 and 22 and the loop bundles 22 and 26, in each case further collar elements 28, 30 that are L-shaped in cross section and are arranged radially within the collar elements 16. These inner collar elements 28, 30 are arranged in mirror symmetry to one another and each have a radial limb 32 of the L and an axial limb 34 of the L. The axial limb 34 of the L determines by means of its axial dimension the axial width b of the loop bundles 20 and 26. The space B between the two radial limbs 32 of the L determines the axial width of the loop bundle 22.

Figure 6:
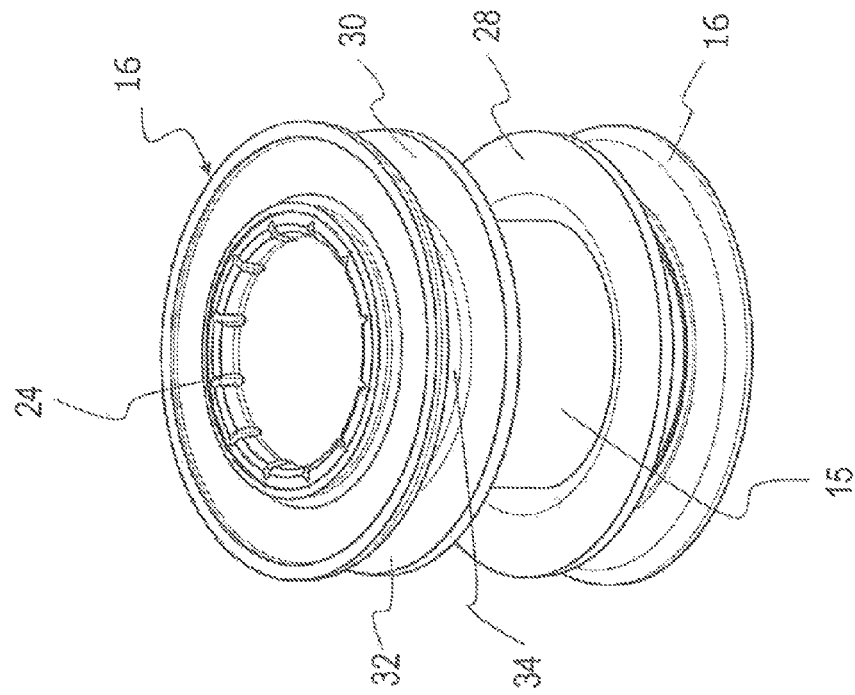
FIG. 6 shows a perspective individual illustration of a bushing arrangement according to a first exemplary embodiment, for a resilient joint member according to the present invention.
Figure 4:
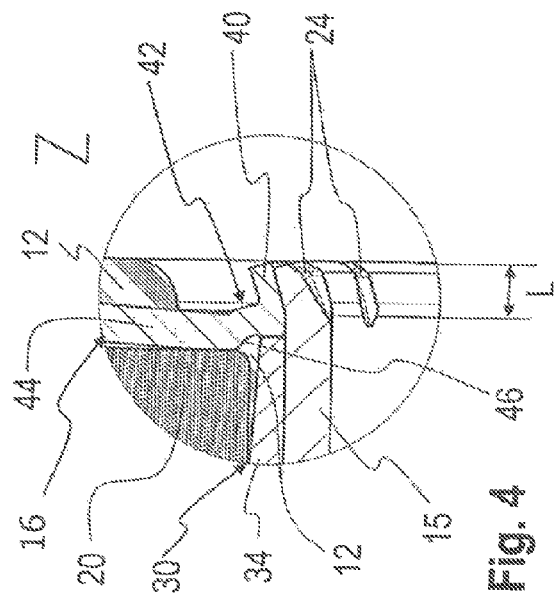
FIG. 4 shows an enlarged detail view of the region labelled Z in FIG. 3.
Figure 5:
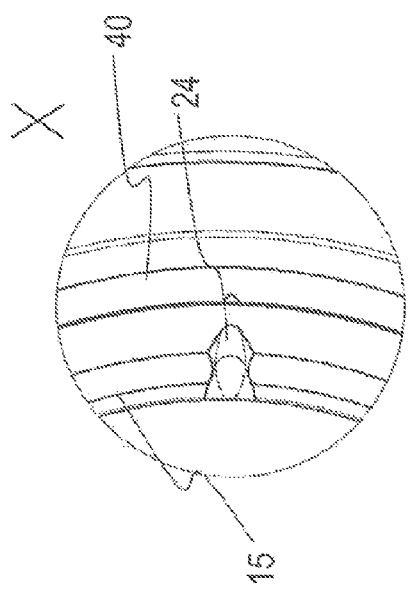
FIG. 5 shows an enlarged detail view of the region labelled X in FIG. 2.

Turning now to the detail illustrations according to FIGS. 4 to 6, it can be seen that the collar element 16 is constructed to have a relatively short fixing section 40 that is in contact with the axial end of the tubular section 15. The fixing section 40 is connected, by way of a transition section 42, to the substantially radial support section 44. The fixing section 40 serves to fix the collar element 16 to the tubular section 15. The support section 44 serves to axially support the loop bundle 20. The transition section 42 is in the form of a shoulder and has a recess 46. The axial end of the axial limb 34 of the L of the collar element 30 penetrates into this recess 46 and abuts, in direct contact, against the collar element 16. As a result, it is possible to avoid undesirable clamping of individual threads of the loop bundle 20 in the contact region between the collar element 16 and the collar element 30. It should be noted that rubber material of the sheath 12 penetrates into the region of the recess 46 between the loop bundle 20 and the collar element 34.

As indicated above, the invention is substantially concerned with the connection between the collar elements 16 and the tubular sections 15. For this purpose, it is provided for the tubular sections 15 to be conically widened in the region of their axial ends by the length L, as shown in FIG. 4. This has the effect of deforming both the axial end of the respective tubular section 15 and, arranged thereon, the fixing section 40 of the collar element 16. A conical widening of this kind serves to provide fixing between the axial end of the respective tubular section 15 and, arranged thereon, the fixing section 40 of the collar element 16, and further has the advantage of an assembly aid for introducing torque transmitting pins when the joint member is mounted in a shaft arrangement. However, because of the relatively short axial length of the fixing section 40 in the construction shown, the conical widening is not sufficient to ensure a secure connection under load between the tubular section 15 and the collar element 16 over the entire service life. In particular under load, the conical widening of an axially short construction of this kind cannot reliably prevent the collar element 16 from becoming detached from the tubular section 15 or popping off it.

For this reason, the invention provides, in addition or as an alternative, for providing the plurality of axial slot-shaped caulking areas 24. These caulking areas 24, in the case of the example twelve such caulking areas 24 arranged at regular angular intervals of 30° over the inner peripheral face of the tubular section 15, extend slightly further in the axial direction than the length L over which the axial end region of the tubular section 15 is conically widened. The slot-shaped caulking areas 24 are constructed to have a rounded inner contour and also run conically, that is to say obliquely in relation to the longitudinal axis M. The rounded inner contour is determined by transition radii which are deliberately selected and provided in order to achieve a desired local impressed stamping. As a result, in the region around the slot-shaped caulking areas 24 it is possible to achieve material displacement deliberately when the caulking areas 24 are manufactured. The material flows radially outwards towards the collar element 16 and there ensures local compression, where appropriate with additional local deformation. As a result, in the region of the slot-shaped caulking areas 24 the connection between the tubular section 15 and the fixing section 40 of the collar element 16 is improved, which reliably prevents the collar element 16 from becoming detached or popping off under load.

In addition to the conical widening in the region L, there is therefore a desired local material deformation of the tubular section 15 and the collar element 16 which is in each case arranged on the end side thereof. The plurality of these local material deformations has the effect of a toothing in the collar element 16 and the tubular section 15.

Manufacture is performed using a stamp (not shown) which on the one hand provides for the widening in the region L of the tubular section 15 by way of a conical portion, and on the other produces the local caulking areas 24 with the material flow described above by way of deformation edges arranged in the region of this conical portion. Forming is performed as a cold forming.

Further embodiments of the invention will be described below. For components that are similar or have an equivalent effect, the same reference numerals are used but preceded by an additional digit.

FIGS. 7 and 8 show bushings 114 and collar elements 116 and inner collar elements 128, 130 according to a second exemplary embodiment of the present invention.

According to this exemplary embodiment, the outer collar elements 116 are substantially in the form of discs and include a fixing section 140. The fixing section 140 is connected, by way of a transition section 142, to the radial support section 144. The support section 144 is curved or bent outwards in the axial direction in its radial end region. The transition section 142 has a recess 146. The recess 146 forms an abutment face for the axial end or the axial end surface of the axial limb 134 of the L of the collar element 130. The recess 146, or its abutment face, is in contact with the collar element 116 and the axial end of the limb 134 of the L. Both the fixing section 140 and the axial limb 134 of the L abut against an axial tubular section 115a and 115b of the bushing 114.

The bushing 114 includes three axial tubular sections 115a, 115b and 115c. The tubular sections 115a, 115b and 115c differ in their external diameters $D_1$, $D_2$ and $D_3$. The section 115a has the largest external diameter $D_1$. The tubular sections 115b and 115c respectively have a reduced external diameter $D_2$ and $D_3$. The tubular sections 115a, 115b and 115c are respectively connected to one another by radial sections 115d and 115e. In other words, the axial ends of the bushing 114 are provided with inset regions or are constructed to be stepped in cross section. The limb 134 of the L of the collar elements 128, 130 abuts against the tubular section 115a having the largest external diameter $D_1$. The fixing section 140 of the collar element 116 abuts against the tubular section 115b, which has a reduced external diameter $D_2$ by comparison with the tubular section 115a. The recess 146, or the surface of the recess 146, abuts against both the axial end face of the L-shaped limb 134 and against the section 115d which connects the tubular sections 115a and 115b to one another. The tubular section 115c, that is to say the tubular section having the smallest external diameter $D_3$, may be axially caulked for the purpose of securing the collar element 116 to the bushing 115.

FIG. 8 shows the bushing 114 and the collar elements 116 in the caulked condition. The tubular section 115c which forms the axial end section of the bushings 114 has been plastically deformed by a stamp and has been radially outwardly "folded" or bent in order to caulk the collar elements 116 to the bushing 114. In the caulked condition, the tubular section 115c overlaps with the collar element 116 in certain regions. As a result, the collar elements 116 are firmly connected to the bushing 114, with the result that the collar elements 116 are held securely in their position even in the event of strong forces acting on the bushing arrangement.

FIG. 9 shows a detail view of the detail VII in FIG. 7.

In FIG. 9, the tubular sections 115a, 115b and 115c are clearly visible, being respectively connected to one another by way of a radial section 115d and 115e. The collar element 116 bears by means of its recess 146 against the radial section 115d and the axial end face of the limb 134 of the L of the collar elements 128, 130.

FIG. 10 is a detail view of the detail VIII in FIG. 8, in which a detail of the bushing arrangement after riveting is shown.

The tubular section 115c, which forms the axial end section of the bushing 114, has been bent axially outwards beyond the radial section 115e and so secures the collar element 116 in the axial direction.

FIGS. 11 and 12 show a further exemplary embodiment of the bushings 214, the collar elements 216 and the inner collar elements 228 and 230.

The essential difference between the exemplary embodiment according to FIGS. 11 and 12 and the previously described exemplary embodiment according to FIGS. 7 to 10 is that the bushing 215 has only two tubular sections 215a and 215b. The tubular section 215b has a smaller external diameter $D_2$ than the tubular section 215a. The tubular section 215a is connected to the tubular section 215b by way of a section 215d that extends radially and against which the recess 246 of the collar elements 216 bears. The fixing section 240 abuts against the tubular section 215d, as in the exemplary embodiment described above.

FIG. 12 shows the bushing 214 and the collar elements 216 in the caulked condition, that is to say the tubular section 215b has been caulked such that it has been folded radially outwards in certain regions. As seen in the axial direction, the tubular section 215b is bent radially outwards by the caulking in the area adjoining the fixing section 240 of the collar element 216, in order to connect the collar elements 216 to the bushing 215. The caulking of the collar elements 216 to the bushing 215 also secures the collar elements 228 and 230 to the bushing 215 and means that in the event of load on the joint member (see FIGS. 1 and 2) they cannot migrate axially outwards.

FIG. 12 further shows an inner bushing 248 which extends through the bushings 214. The joint member (FIGS. 1 and 2) is screwed to a flange (not shown) by way of a plurality of inner bushings 248.

The radial ends of the collar elements 216 are surrounded by the elastic sheath 212 in the region 250, as can be seen in FIG. 10, or they are embedded in the elastic sheath 112.

FIGS. 13 and 14 show sectional views of a bushing arrangement according to a fourth exemplary embodiment.

The bushing 314 has only one tubular section 315 of constant external diameter. The collar elements 316 bear against the outer periphery of the bushing 314 by means of their fixing section 340, and the collar elements 330 and 328 do so by means of the limbs 334 of their L shape.

FIG. 14 shows a view of the bushing arrangement after caulking. The axial end section of the bushings 314 has been caulked in order to secure the collar elements 316 to the bushing 314. Caulking of the bushing 314 to the collar elements 316 is accordingly still possible if the bushing 314 has no tubular section of reduced diameter in its axial end section.

The recess 346 of the disc-shaped collar element 316 abuts against the axial end face of the limb 334 of the L. The bushing 314 according to this exemplary embodiment may for example be caulked to the collar element 316 by way of orbital riveting or orbital caulking.

FIG. 15 shows a detail view of the detail XIII in FIG. 13, in which it can be seen that the bushing 314 has no end section of reduced external diameter but that it is constructed with a constant external diameter over its entire axial extent. The disc-shaped collar element 316 abuts against the outer periphery of the bushing 314 by means of its fixing section 340, and the recess 346 abuts against the axial end face of the limb 334 of the L.

FIG. 16 shows a detail view of the detail XIV in FIG. 14.

The axial end section of the bushing 314 has been caulked to the collar element 316 such that the axial end section of the bushing 314 overlaps the disc-shaped collar element 316 and its fixing section 340, at least in certain regions. The radial end regions of the collar elements 316 and the radial ends of the support section 344 are surrounded, in the region 350, by the elastic sheath 312. Apart from the region 350, the face of the collar elements 316 which is on the outside as seen in the axial direction is free of the elastic sheath 312.

FIGS. 17 and 18 show sectional views of a bushing arrangement according to a fifth exemplary embodiment of the invention.

The essential difference between this exemplary embodiment and the exemplary embodiment described in relation to FIGS. 13 to 16 is that the axially outer collar elements 416 according to this exemplary embodiment are constructed in the form of L-shaped flanges, that is to say they have a section that abuts against the outer periphery of the bushing 414. The bushing 414 according to this exemplary embodiment has a constant external diameter, and the axial end section of the bushing 414 is caulked to the collar element 416. The axial end section overlaps the axial end face of the section of the collar element 416 that abuts against the outer periphery of the bushing 414.

The collar elements 416 are completely embedded in the elastic sheath 412.

FIGS. 19 and 20 show detail views of the sectional views, shown in FIGS. 17 and 18, of the bushing arrangement according to the fifth exemplary embodiment.

FIGS. 21 and 22 show sectional views of a bushing arrangement according to a sixth exemplary embodiment of the invention. At their fixing sections 540, the collar elements 516 have a curved end section 552 which bears against the radial section 515d and in certain regions against the tubular section 515b. The fixing section 540 of the collar elements 516 is correspondingly adapted to the shape, which is stepped in cross section, of the bushings 514 having the tubular sections 515a and 515b. The axial end face of the limb 534 of the L of the collar elements 530 and 528 bears against the transition section 542 of the collar elements 516.

FIG. 22 shows the bushing arrangement according to FIG. 21 in the caulked condition.

The axial end section 515b has been caulked in certain regions, and overlaps with the curved section 552 of the fixing section 540 of the collar elements 516. In other words, as a result of the curvature of the section 552 inwards in the direction of the axis of the bushings 514 and bending the axial end sections 515b radially outwards during caulking, a double securing of the collar elements 516, 528 and 530 is achieved.

FIG. 23 shows a detail view of the detail XXI in FIG. 21.

The curved section 552 of the fixing section 540, which engages in the inset region formed by the tubular section 515b and the radially extending section 515d, can be seen in FIG. 23.

FIG. 24 shows a detail view of the detail XXII in FIG. 22.

The radially inwardly curved section 552 of the fixing section 540 is held in its position in the axial direction of the bushings 514 by the radially outwardly bent end section 515b and the radial section 515d, and is received between the sections 515b and 515d in the caulked condition of the bushing arrangement.

FIGS. 25 and 26 show sectional views of a bushing arrangement according to a seventh exemplary embodiment of the invention.

The bushing 614 has tubular sections 615a and 615b of different diameters $D_1$ and $D_2$. The tubular sections 615a and 615b are connected to one another by way of the radial section 615d. The axial end face of the fixing section 640 of the collar elements 616 lies at the level of the radial section 615d, that is to say at the transition from the tubular section 615a of diameter $D_1$ to the tubular section 615b of smaller diameter (diameter $D_2$).

FIG. 26 shows a sectional view of the bushing arrangement in the caulked condition. The tubular section 615b has been bent radially outwards by the caulking, and overlaps the axial end face of the fixing section 640.

FIG. 27 shows a detail view of the detail XXV in FIG. 25.

It can clearly be seen in FIG. 27 that the axial end face of the fixing section 640 is at substantially the same axial level as the radial section 615d of the bushing 614.

FIG. 28 shows a detail view of the detail XXVI in FIG. 26.

The tubular section 615b, which forms the axial end section of the bushing 614, overlaps the axial end face of the fixing section 640, that is to say it is caulked to the collar element 616.

FIGS. 29 and 30 show an eighth exemplary embodiment.

According to FIG. 29, a notch 754 is made between tubular sections 715a and 715b of the bushing 714. The notch 754 is located in the bushing 714, in the region of the axial end face of the fixing section 740.

FIG. 30 shows the bushing arrangement according to FIG. 29, in the caulked condition.

The tubular section 715b has been bent radially outwards by the caulking, as a result of which the notch 754 has been closed. Further, the end section 715b overlaps the axial end face of the fixing section 740 of the collar elements 716, at least in certain regions.

FIG. 31 shows a detail view of the detail XXIX in FIG. 29.

The notch 754, which separates the tubular section 715a from the tubular section 715b, can be seen in FIG. 31. The notch 754 is located substantially in the region in which the axial end face of the fixing section 740 is provided.

FIG. 32 shows a detail view of the detail XXX in FIG. 30.

It is clear from FIG. 32 that the end section 715b has been bent radially outwards, the notch 754 is partly closed, and the axial end section 715b overlaps the axial end face of the fixing section 740.

The invention allows a secure and reliable connection to be achieved between the bushing 14, 114, 214 and the tubular section 15, 115, 215, in a relatively simple manner and with little technical effort, with very little axial space being required for this connection.

The invention claimed is:

1. A resilient joint member for a shaft arrangement for the articulated connection of two shaft sections, comprising:
a plurality of bushings which are arranged at predetermined angular intervals in a peripheral direction in relation to a centre axis of the joint member;
a plurality of loop bundles, wherein each loop bundle loops around respectively two adjacent bushings and each bushing has at least two loop bundles looped around it; and
an elastic sheath in which the loop bundles and the bushings are at least partly embedded,
wherein the bushings have an axial tubular section around which there loop the loop bundles that are associated with the bushing and on which, at least at an axial end region, a collar element is arranged for axial support of one of the loop bundles, and wherein the collar element that is arranged at the axial end region is configured to have a support section that runs substantially radially with respect to the tubular section and to have a fixing section that is in contact with the tubular section,
wherein the fixing section of the collar element is axially caulked to the tubular section,
wherein the axial end region of the tubular section of the bushings is deformed to provide a connection to the fixing section of the collar elements, and
wherein a transition between the support section and the fixing section of the collar element is constructed such that it is stepped, with a transition shoulder in the support section.

2. A resilient joint member according to claim 1, wherein the fixing section of the collar element is fixed to the tubular section by local axial caulking areas.

3. A resilient joint member according to claim 2, wherein the axial caulking areas are arranged on the end face, at the axial end of the tubular section or the fixing section.

4. A resilient joint member according to claim 2, wherein the axial caulking areas are slot-shaped.

5. A resilient joint member according to claim 2, wherein the axial caulking areas are arranged at regular angular intervals over an inner periphery of the tubular section or over an outer periphery of the fixing section.

6. A resilient joint member according to claim 2, wherein at least three caulking areas are provided over the periphery of the tubular section.

7. A resilient joint member according to claim 1, wherein the tubular section and the fixing section are radially widened in a region of the caulking areas.

8. A resilient joint member according to claim 7, wherein the tubular section and the fixing section are radially widened in the region of the caulking areas in the shape of a star or conically.

9. A resilient joint member according to claim 1, wherein there is arranged on the tubular section, axially spaced from an end-face collar element, at least one further inner collar element that is associated with this collar element.

10. A resilient joint member according to claim 9, wherein the inner collar element is L-shaped, as seen in a section containing the axis, with the inner collar element having a radial limb of the L and, abutting against the tubular section, an axial limb of the L.

11. A resilient joint member according to claim 10, wherein the axial limb of the L is in contact with the end-face collar element.

12. A resilient joint member according to claim 11, wherein the axial limb of the L abuts against the transition shoulder.

13. A resilient joint member according to claim 10, wherein an axial length of the axial limb of the L determines a width of a guide region for a loop bundle.

14. A resilient joint member according to claim 1, wherein the bushing has at least one axial end section of reduced external diameter.

15. A resilient joint member according to claim 14, wherein the fixing section of the collar elements bears against the at least one axial end section of reduced external diameter.

16. A resilient joint member according to claim 14, wherein the collar element bears against at least one radial section by its at least one recess.

17. A resilient joint member according to claim 14, wherein the at least one axial end section of reduced external diameter is axially caulked to the collar element.

18. A resilient joint member according to claim 1, wherein the collar elements are in the form of discs.

19. A resilient joint member according to claim 1, wherein radial ends of the collar elements are at least partly surrounded by the elastic sheath.

* * * * *